United States Patent
Davis

(10) Patent No.: US 11,326,015 B1
(45) Date of Patent: May 10, 2022

(54) CYANATE ESTER RESIN

(71) Applicant: The United States of America, as represented by the Secretary of the Navy, Arlington, VA (US)

(72) Inventor: Matthew C. Davis, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 284 days.

(21) Appl. No.: 16/265,336

(22) Filed: Feb. 1, 2019

(51) Int. Cl.
C08G 18/02 (2006.01)
C07F 9/50 (2006.01)

(52) U.S. Cl.
CPC .......... *C08G 18/022* (2013.01); *C07F 9/5022* (2013.01); *C07F 9/5054* (2013.01)

(58) Field of Classification Search
None
See application file for complete search history.

(56) References Cited

U.S. PATENT DOCUMENTS 3,067,258 A * 12/1962 Grayson .................. C07C 11/12
568/14

FOREIGN PATENT DOCUMENTS

CN 108219367 A * 6/2018

OTHER PUBLICATIONS

Abed et al., "Synthesis and Characterization of New Phosphorus and Other Heteroatom Containing Aryl Cyanate Ester Monomers and Networks," Journal of Polymer Science, Part A, Polymer Chemistry, vol. 35, issue 6, pp. 977-987. (Year: 1996).*
Davis et al., "Flame Retardant Polycyanurate Thermosets from CyanateEsters of Triphenylpheosphine Oxide," Journal of Polymer Science, Part A: Polymer Chemistry vol. 56., pp. 1100-1110 (2018) (Year: 2018).*

* cited by examiner

*Primary Examiner* — Rachel Kahn
*Assistant Examiner* — Ha S Nguyen
(74) *Attorney, Agent, or Firm* — Naval Air Warfare Center; Matthew D. Pangallo; Stuart H. Nissim

(57) ABSTRACT

A method for making a cyanate ester resin includes reacting an arylorganometallic agent with a phosphorous halide in a solvent forming methoxy functionalized triphenylphosphines with one to six meta-methoxy groups. The methoxy functionalized triphenylphosphines with one to six meta-methoxy groups are reacted with an oxidizing agent forming a methoxy functionalized triphenylphosphine oxide including one to six meta-methoxy groups. The methoxy functionalized triphenylphosphine oxide is reacted with a dealkylating agent forming a hydroxy substituted triphenylphosphineoxide including one to six meta-hydroxyl groups. The hydroxy substituted triphenylphosphineoxide is reacted with cyanating reagent and a base forming a substituted triphenylphosphine oxide including one to six meta-cyanate groups. The substituted triphenylphosphine oxide is polymerized forming the cyanate ester resin.

18 Claims, 8 Drawing Sheets

CYANATE ESTER RESIN

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Polymer composite matrices include a polymer resin, such as hydrocarbons, and a fiber, such as organic fibers or glass fibers. There are two types of polymer composite matrices that are currently produced and used for various applications. The first type is reinforced polymer composite matrices, which are inexpensive and used in pipes, automotive panels, and sporting goods. The second type is advanced composites, which can be expensive and used in aircraft and the aerospace industry. Polymer composite matrices are highly valuable in these applications because of a high strength to weight ratio provided by these materials.

BRIEF DESCRIPTION OF THE DRAWINGS

Features and advantages of examples of the present disclosure will be apparent by reference to the following detailed description and drawings, in which like reference numerals correspond to similar, though perhaps not identical, components. Reference numerals or features having a previously described function may or may not be described in connection with other drawings in which they appear.

DETAILED DESCRIPTION

Figure 1:
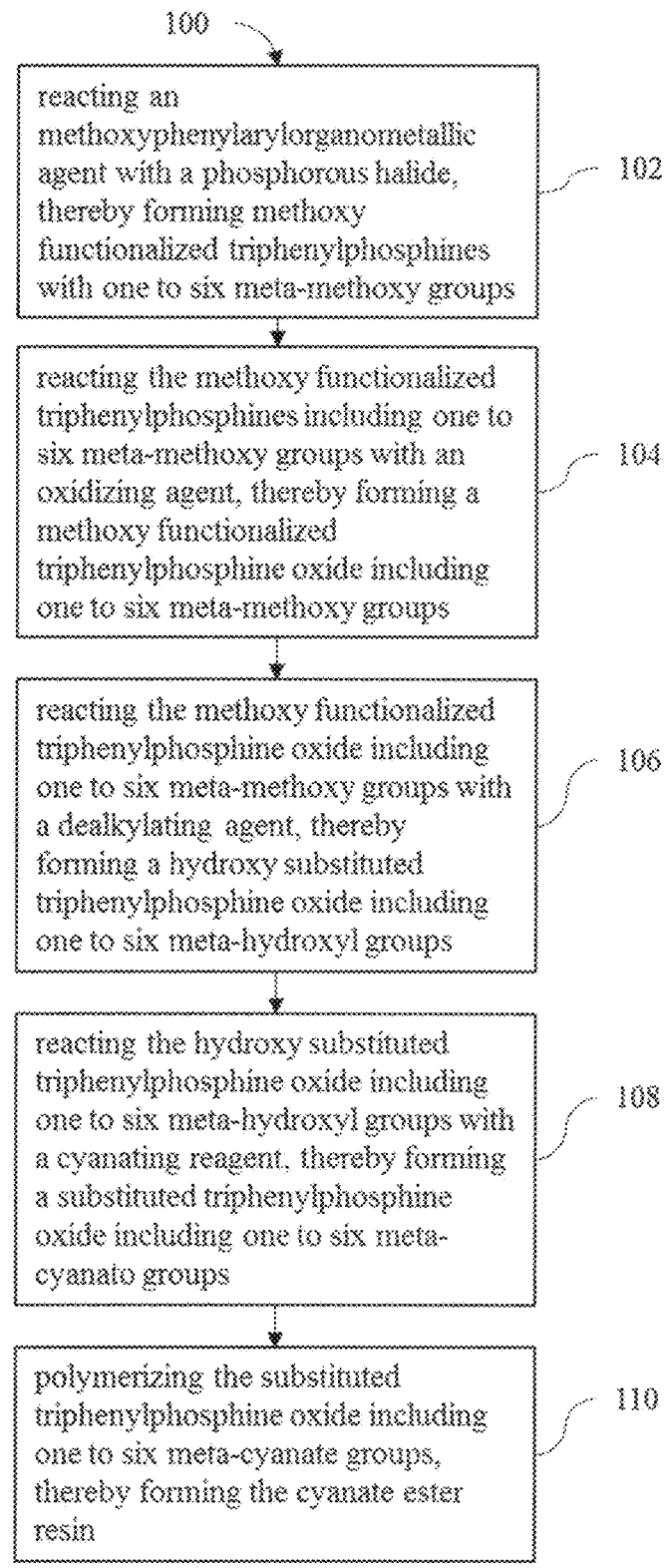
FIG. 1 is a flow diagram illustrating an example of a method for making a cyanate ester resin described herein.

Generally, due to the polymer resins being composed primarily of hydrocarbons, the polymer resins can oxidize and combust. For example, bisphenol A diglycidyl ether, which is a common epoxy resin used in a polymer composite matrix, is highly flammable. Bisphenol A diglycidyl ether has a heat release capacity of over 650 J/gK and a UL 94 classification of F with a sustained combustion. Therefore, common epoxy resins using bisphenol A diglycidyl ether pose a risk of combustion in any applications involving elevated temperatures. In addition, common epoxy resins may also have a glass transition temperature below 150° C., which may cause dimensional stability issues in applications where the polymer composite matrix is subjected to elevated temperatures.

The cyanate ester resin disclosed herein meets the requirements to be classified as a high performance polymer resin or polymer composite matrix. A high performance polymer resin is any polymer resin with a glass transition temperature greater than 150° C. This characteristic makes the polymer resin stable when used in high temperature applications. In addition, the cyanate ester resins herein have a UL 94 flammability classification of non-flammable or V-0. As a result, the cyanate ester resins herein can be used in high performance applications while increasing the safety of the polymer composite matrices even when the resins of this invention are blended or mixed with other flammable resins by decreasing the susceptibility to oxidation and combustion.

The method for making the cyanate ester resin herein includes reacting a methoxyphenylorganometallic agent, with one or two methoxy groups located at meta positions relative to the metal atom, with a phosphorous halide to form methoxy functionalized triphenylphosphines with one to six methoxy groups. In some examples, the methoxy groups are all at meta positions relative to the phosphorus atom. The methoxy functionalized triphenylphosphines are reacted with an oxidizing agent to form a methoxy functionalized triphenylphosphine oxide including one to six meta-methoxy groups. The methoxy functionalized triphenylphosphine oxide including one to six methoxy groups is reacted with a dealkylating agent to form a hydroxy substituted triphenylphosphine oxide including one to six meta-hydroxyl groups. The hydroxy substituted triphenylphosphine oxide including one to six hydroxyl groups is reacted with a cyanating reagent to form a substituted triphenylphosphine oxide including one to six meta-cyanato groups. Lastly, the substituted triphenylphosphine oxide including one to six meta-cyanate groups is polymerized to form the cyanate ester resin.

Referring now to method 100 for making a cyanate ester resin, step 102 includes reacting an methoxyphenylorganometallic agent, containing one or two methoxy groups meta to the metal atom, with a phosphorous halide in a solvent, thereby forming methoxy functionalized triphenylphosphines with one to six meta-methoxy groups. This reaction forms the triphenylphosphine structure that provides the non-flammable characteristics of the resin. The reaction is conducted at a temperature ranging from about −80° C. to about −60° C. for a time ranging from about one to about six hours. In some examples, the methoxy functionalized triphenylphosphines with one to six meta-methoxy groups can be separated from or remain in the product mixture and used in the subsequent step. When the methoxy functionalized triphenylphosphines are separated, any known technique may be used, such as silica or alumina gel chromatography.

Figure 2:
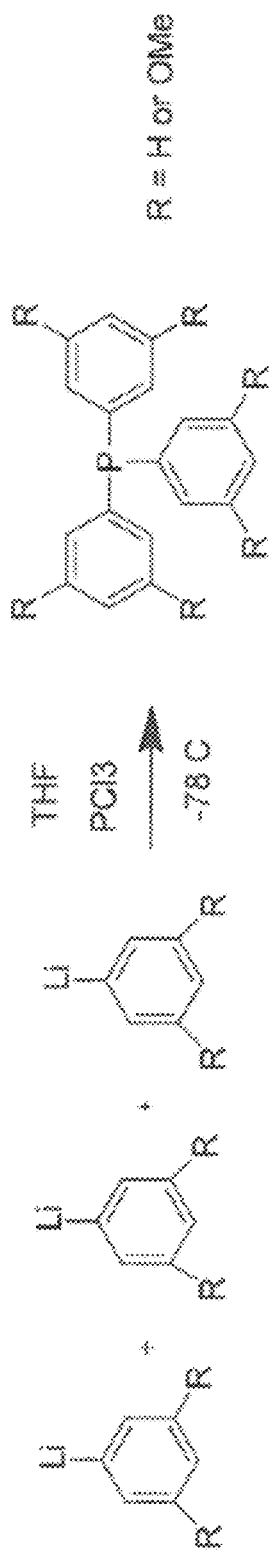
FIG. 2 is an example of a synthesis of the first step of the method for making a cyanate ester resin described herein.

An example of the reaction in step 102 is shown in FIG. 2. 3-Methoxyphenyllithium, 3,5-dimethoxyphenyllithium, and 3-phenyllithium are mixed with phosphorous trichloride in tetrahydrofuran (THF) at −78° C. The reaction forms triphenylphosphine with one to six meta-methoxy groups depending on the addition ratio of the three aryllithium molecules.

The methoxyphenylorganometallic agent contains the phenyl groups that form the triphenylphosphines. The methoxyphenylorganometallic reagent or reagents are added into the reaction with a sum total that is three parts for every one part of phosphorus trihalide. Some examples of the methoxyphenylarylorganometallic agent that may be used in this reaction include phenyllithium, 3-methoxyphenyllithium, 3,5-dimethoxyphenyllithium, phenylmagnesium, 3-methoxyphenylmagnesium, 3,5-dimethoxyphenylmagnesium, and combinations thereof.

The phosphorous halide includes the phosphorous atom in the triphenylphosphines. The phosphorus halide reagent or reagents are added into the reaction with a sum total that is one part for every three parts of the methoxyphenylorganometallic reagent. Some examples of phosphorous halides that may be used in this reaction include phosphorus tribromide, phosphorus trichloride, and combinations thereof.

Any solvent that can dissolve the arylorganometallic agent and the phosphorous halide in the reaction may be used. An example of a solvent is tetrahydrofuran (THF), 2-methyltetrahydrofuran, diethyl ether, 1,4-dioxane, and combinations thereof.

Some examples of the methoxy functionalized triphenylphosphines with one to six meta-methoxy groups formed in the reaction include 3-methoxyphenyldiphenylphosphine, bis(3-methoxyphenyl)phenylphosphine, tris(3-methoxyphenyl)phosphine, 3,5-dimethoxyphenyldiphenylphosphine, bis(3,5-dimethoxyphenyl)phenylphosphine, tris(3,5-dimethoxyphenyl)phosphine, bis(3-methoxyphenyl) 3,5-dimethoxyphenylphosphine, bis(3,5-dimethoxyphenyl) 3-methoxyphenylphosphine, 3,5-dimethoxyphenyl-3-methoxyphenyl-phenylphosphine, and combinations thereof.

Referring back to method 100, after forming methoxy functionalized triphenylphosphines with one to six meta-methoxy groups, the next step 104 includes reacting the methoxy functionalized triphenylphosphines with one to six meta-methoxy groups with an oxidizing agent, thereby forming a methoxy functionalized triphenylphosphine oxide including one to six meta-methoxy groups. The step 104 oxidizes the phosphorous atom in the triarylphosphine. The reaction ranges from about 1 hour to about 24 hours to complete. Similar to step 102, in step 104, in some examples, the methoxy functionalized triphenylphosphine oxide including one to six meta-methoxy groups can be separated from or remain in the product mixture and used in the subsequent step. When the methoxy functionalized triphenylphosphine oxide is separated, any known technique may be used, such as silica or alumina gel chromatography.

Figure 3:
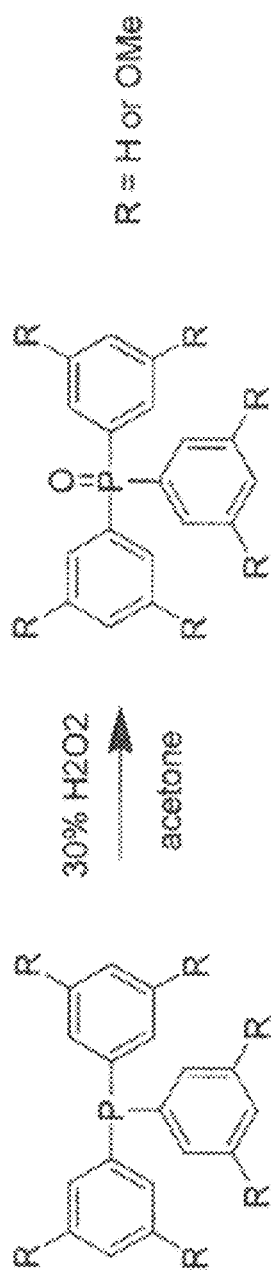
FIG. 3 is an example of a synthesis of the second step of the method for making a cyanate ester resin described herein.

An example of the reaction in step 104 is shown in FIG. 3. The triarylphosphine molecules are reacted with the oxidizing agent in acetone. The reaction produces methoxy functionalized triphenylphosphine oxide with hydrogens or meta-methoxy groups bonded to the phenyl groups at meta positions.

The oxidizing agent facilitates the oxidation reaction and is added in excess parts (2 to 10) for every one part of methoxy functionalized triphenylphosphine. Some examples of the oxidizing agent include aqueous hydrogen peroxide with a concentration ranging from about 5% to about 50%, a mixture of oxygen and nitrogen with a nitrogen concentration ranging from about 5% to about 80% (e.g., air), iodosobenzene, iodoxybenzene, metachloroperoxybenzoic acid (MCPBA), tert-butylhydroperoxide, manganese diiodide, dimethyldioxirane, potassium peroxymonosulfate, sodium perbromate, sodium perborate and combinations thereof.

Some examples of the methoxy functionalized triphenylphosphine oxide including one to six meta-methoxy groups include 3-methoxyphenyldiphenylphosphineoxide, bis(3-methoxyphenyl) phenylphosphineoxide, tris(3-methoxyphenyl)phosphineoxide, 3,5-dimethoxyphenyldiphenylphosphineoxide, bis(3,5-dimethoxyphenyl)phenylphosphineoxide, tris(3,5-dimethoxyphenyl)phosphineoxide, bis(3-methoxyphenyl)3,5-dimethoxyphenylphosphineoxide, bis(3,5-dimethoxyphenyl)3-methoxyphenylphosphineoxide, 3,5-dimethoxyphenyl-3-methoxyphenyl-phenylphosphineoxide, and combinations thereof.

Referring back to method 100, after forming the methoxy functionalized triphenylphosphine oxide including one to six meta-methoxy groups, step 106 includes reacting the methoxy functionalized triphenylphosphine oxide including one to six meta-methoxy groups with a dealkylating agent, thereby forming a hydroxy substituted triphenylphosphine oxide including one to six meta-hydroxyl groups. For every one part of methoxy functionalized triphenylphosphine oxide there should be three to thirty parts of the dealkylating agent. This reaction occurs at elevated temperature, from about 100° C. to about 200° C., for a time ranging from about one to six hours. Similar to step 102, in step 106, in some examples, the hydroxy substituted triphenylphosphine oxide including one to six meta-hydroxyl groups can be separated from or remain in the product mixture and used in the subsequent step. When the hydroxy substituted triphenylphosphine oxide is separated, any known technique may be used, such as silica or alumina gel chromatography.

Figure 4:
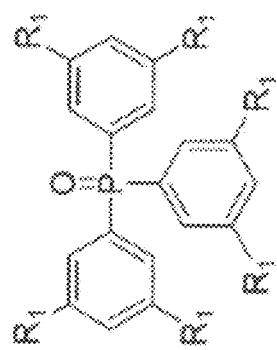
FIG. 4 is an example of a synthesis of the third step of the method for making a cyanate ester resin described herein.
Figure 4:
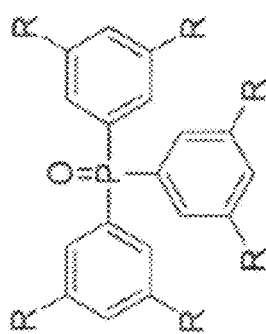

An example of the reaction in step 106 is shown in FIG. 4. The methoxy functionalized triphenylphosphine oxide is reacted with pyridine hydrochloride (i.e., the dealkylating agent) at reflux. The reaction produces hydroxy substituted triphenylphosphine oxide with hydrogens or hydroxyl groups bonded to the phenyl groups at meta positions.

The dealkylating agent reveals hydroxyl groups on the phenyl groups at the same meta-positions where the methoxy groups originally were in the methoxy functionalized triphenylphosphine oxide molecules. The dealkylating agent may be present in the reaction in an amount ranging from about 5 to about 50 parts per 1 part methoxy functionalized triphenyphosphine oxide molecule. Some examples of the dealkylating agents include pyridinium hydrochloride, hydroiodic acid, hydrobromic acid, potassium hydroxide, boron tribromide, sodium ethanethiolate, lithium chloride, trimethylsilyl iodide, and combinations thereof.

Some examples of the hydroxy substituted triphenylphosphineoxide including one to six meta-hydroxyl groups include 3-hydroxyphenyldiphenylphosphineoxide, bis(3-hydroxyphenyl) phenylphosphineoxide, tris(3-hydroxyphenyl) phosphineoxide, 3,5-dihydroxyphenyldiphenylphosphineoxide, bis(3,5-dihydroxyphenyl)phenylphosphineoxide, tris(3,5-dihydroxyphenyl)phosphineoxide, bis(3-hydroxyphenyl)3,5-dihydroxyphenylphosphineoxide, bis(3,5-dihydroxyphenyl)3-hydroxyphenylphosphineoxide, 3,5-dihydroxyphenyl-3-hydroxyphenyl-phenylphosphineoxide, and combinations thereof.

Referring back to method 100, after forming the hydroxy substituted triphenylphosphine oxide including one to six meta-hydroxyl groups, step 108 includes reacting the hydroxy substituted triphenylphosphine oxide including one to six meta-hydroxyl groups with a cyanating reagent and a base, thereby forming a substituted triphenylphosphine oxide including one to six meta-cyanato groups. A solvent may also be used in the reaction. The solvent may be the same solvents described in step 102 herein. This reaction occurs at a temperature ranging from about −78° C. to about 0° C. for a time ranging from about one hour to about six hours. Similar to step 102, in step 108, in some examples, the substituted triphenylphosphine oxide including one to six meta-cyanato groups can be separated from or remain in the product mixture and used in the subsequent step. When the substituted triphenylphosphine oxide is separated, any known technique may be used, such as silica or alumina gel chromatography.

Figure 5:
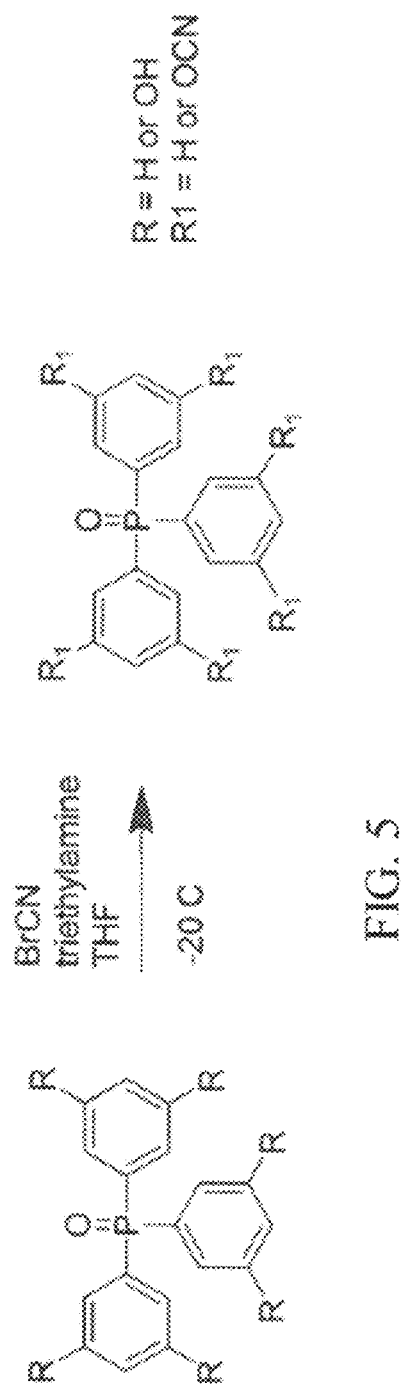
FIG. 5 is an example of a synthesis of the fourth step of the method for making a cyanate ester resin described herein.

An example of the reaction in step 108 is shown in FIG. 5. The hydroxy substituted triphenylphosphineoxide is reacted with cyanogen bromide (BrCN), triethylamine as the base, and tetrahydrofuran (THF) as the solvent. The reaction occurs at −20° C. to produce triphenylphosphine oxide with meta-cyanato groups or hydrogens bonded to the phenyl groups at meta positions.

The cyanating agents are used to bond the meta-cyanato groups to the oxygen atoms in the hydroxy substituted triphenylphosphine oxide molecule in the reaction. The cyanating agent may be present in an amount ranging from about 6 parts to 30 parts per 1 part hydroxy substituted triphenylphosphine oxide molecule. Some examples of the cyanating agent include cyanogen bromide (BrCN), cyanogen chloride, para-toluenesulfonyl cyanide, benzenesulfonyl cyanide, and combinations thereof.

The base is used to neutralize the hydrogen ions removed from the hydroxyl groups in the hydroxy substituted triphenylphosphine oxide molecule in the reaction. The base may be present in an amount ranging from about 3 parts to 30 parts per 1 part hydroxy substituted triphenylphosphine oxide molecule. Some examples of the base include triethylamine, trimethylamine, tributylamine, diisopropylethylamine, tetramethylethylenediamine, triphenylamine.

The general formula (I) for substituted triphenylphosphine oxide including one to six meta-cyanato groups is shown below:

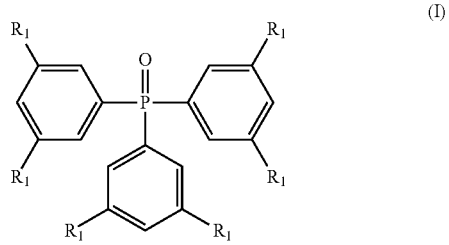

(I)

Figure 6:
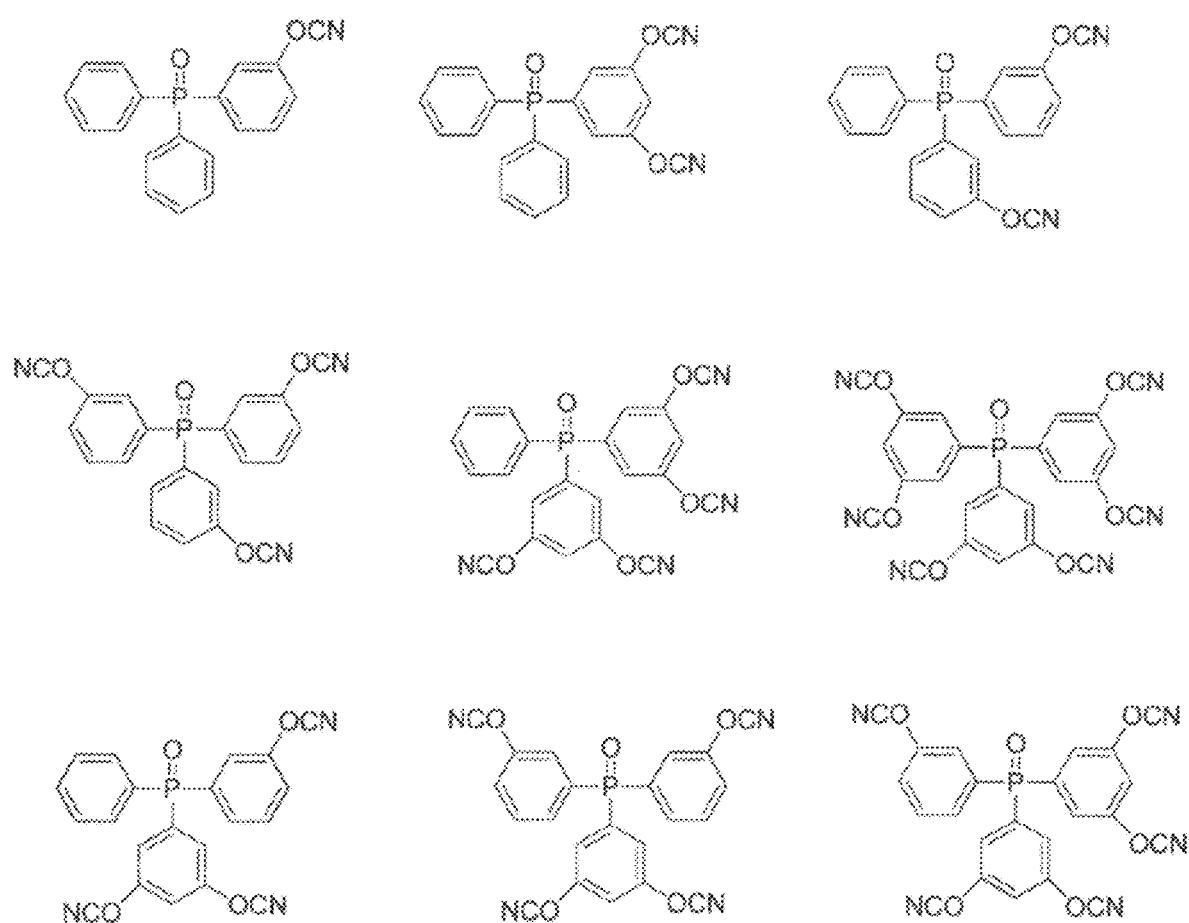
FIG. 6 is example chemical structures of cyanate ester resins produced from the method for making cyanate ester resins described herein.

In formula (I), R can be H or OCN (i.e., cyanato group). Some specific examples of the substituted triphenylphosphine oxide including one to six meta-cyanato groups that is formed in step 108 include 3-cyanophenyldiphenylphosphineoxide, bis(3-cyanatophenyl)phenylphosphineoxide, tris(3-cyanatophenyl)phosphineoxide, 3,5-dicyanatophenyldiphenylphosphineoxide, bis(3,5-dicyanatophenyl)phenylphosphineoxide, tris(3,5-dicyanatophenyl)phosphineoxide, bis(3-cyanatophenyl)3,5-dicyanatophenylphosphineoxide, bis(3,5-dicyanatophenyl) 3-cyanatophenylphosphineoxide, 3,5-dicyanatophenyl-3-cyanatophenyl-phenylphosphineoxide, and combinations thereof. FIG. 6 shows the chemical structure of some specific examples of the substituted triphenylphosphine oxide including one to six meta-cyanato groups.

Referring back to method 100, after forming the substituted triphenylphosphine oxide including one to six meta-cyanato groups, the next step 110 includes polymerizing the substituted triphenylphosphine oxide including one to six meta-cyanate groups, thereby forming the cyanate ester resin. In an example, the substituted triphenylphosphine oxide can be polymerized by heating the substituted triphenylphosphine oxide to a temperature ranging from about 170° C. to about 225° C. and a time ranging from about 6 hours to about 48 hours to form the cyanate ester resin.

In some examples, after forming the cyanate ester resin, the resin may be stored for later use. In other examples, the cyanate ester resin may be blended with a second cyanate ester resin, including those which do not contain any phosphorus, in an amount ranging from about 5 wt % to about 75 wt % based on the total wt % of the cyanate ester resin. The second cyanate ester resin may be added to the cyanate ester resin previously described herein prior to polymerization. Some examples of the second cyanate esters include 2,2-bis(4-cyanatophenyl)propane, 1,1-bis(4-cyanatophenyl)ethane, bis(3,5-dimethyl-4-cyanatophenyl)methane, 3,5-bis(2-(4-cyanatophenyl)-propanyl)benzene, and cyanate esters made from various molecular weight phenol formaldehyde resins, and combinations thereof. Some commercial examples include AROCY® L-10, AROCY® XU 366, AROCY® XU 371 and AROCY® XU 378, PRIMASET® BADCy (i.e., bisphenol A dicyanate ester), PRIMASET LeCy (i.e., bisphenol A dicyanate ester), PRIMASET PT-15, PRIMASET PT-30, PRIMASET METHYLCy, and combinations thereof.

The cyanate ester resin produced herein has a glass transition temperature that is equal to or greater than 250° C. In addition, the cyanate ester resin has a UL 94 classification of V-0, indicating that the cyanate ester resin is non-flammable.

To further illustrate the present disclosure, examples are given herein. It is to be understood that these examples are provided for illustrative purposes and are not to be construed as limiting the scope of the present disclosure.

EXAMPLES

Two example monomers of the cyanate ester resins were prepared. The example cyanate ester resin monomers were tested to determine the X-ray structure, thermal analysis, and flammability. The melting points were collected on a Mel-Temp II from Laboratory Devices (Holliston, Mass.) and are not corrected. All NMR data were collected on a Bruker Avance II 300 MHz spectrometer ($^1$H at 300 MHz, $^{13}$C at 75 MHz, $^{31}$P at 121.5 MHz) and referenced to solvent or tetramethylsilane. All $^{31}$P NMR was performed with 85% $H_3PO_4$ as external standard and the phosphoric acid signal was designated as 0 ppm. Nuclear magnetic resonance data (free-induction decay's) were processed using NUTS software from Acorn NMR (Livermore, Calif.). Elemental analyses were performed by Atlantic Microlab, Inc. (Norcross, Ga.).

Example 1: Synthesis of Phenylbis(3-Cyanatophenyl)Phosphine Oxide

A round-bottomed flask equipped with magnetic stirring bar and addition funnel was charged with anhydrous THF (500 mL) followed by phenylbis(3-hydroxyphenyl)phosphine oxide (22 g, 71 mmol). After all the solids dissolved, the mixture was cooled in a 220° C. bath and then BrCN (22.6 g, 3 equiv) was added and allowed to dissolve completely. The addition funnel was then charged with TEA (20.7 mL, 15.03 g, 149 mmol, 2.1 equiv), which was then added dropwise to the reaction mixture over 30 minutes. A copious white precipitate began to appear shortly after the addition was started. After the addition was complete, the cooling bath was removed and the mixture was allowed to stir at room temperature for 1 hour. The reaction mixture was partitioned between $H_2O$ (500 mL) and toluene (500 mL). The organic phase was washed with $H_2O$ (3×500 mL) and then brine (500 mL). The organic layer was separated and dried over anhydrous $MgSO_4$ and then treated with decolorizing charcoal for several hours. After filtration through celite, the solvent was rotary evaporated (bath T=40° C.) leaving a colorless oil which was stored under dynamic vacuum (0.1 torr) for 24 hours to remove residual solvent and traces of diethylcyanamide (from von Braun degradation of TEA). After storing the crude product for several weeks at room temperature, the product began to crystallize from the melt. Monomer 2 formed a white crystalline solid that was washed with toluene and filtered on filter paper (20.4 g).

The following results were obtained: yield: 80%; Melting point: 89-91° C.; $^1$H {$^{13}$C} NMR (CDCl$_3$, δ, ppm): 7.8-7.5 (m, 13H); $^{13}$C ($^1$H) NMR (CDCl$_3$, δ, ppm): 153.01 (d, $J_{PC}$=16.6 Hz), 135.66 (d, $^1J_{PC}$=102 Hz), 133.27 (d, $J_{PC}$=3 Hz), 131.99 (d, $J_{PC}$=10 Hz), 131.45 (d, $J_{PC}$=13 Hz), 130.45 (d, $J_{PC}$=9.5 Hz), 130.05 (d, $^1J_{PC}$=107 Hz), 129.27 (d, $J_{PC}$=13.1 Hz), 119.23 (d, $J_{PC}$=17.2 Hz), 119.14 (d, $J_{PC}$=25.8 Hz), 108 (OCN); $^{31}$P {$^1$H} NMR (CDCl$_3$, d, ppm): 126.09 (m). The analytical calculated results for $C_{20}H_{13}N_2O_3P$: C, 66.67; H, 3.64; N, 7.77. The results found for the product: C, 66.37; H, 3.65; N, 7.74.

Example 2: Synthesis of Tri(3-Cyanatophenyl)Phosphine Oxide

A round-bottomed flask (100 mL) equipped with magnetic stirring bar and addition funnel with nitrogen bubbler was charged with tris(3-hydroxyphenyl)phosphine oxide (580 mg, 1.8 mmol) and anhydrous THF (15 mL). The solution was cooled in a 220° C. bath before BrCN (760 mg, 7.2 mmol, 4 equiv) was added in one portion and allowed to dissolve completely. The funnel was charged with TEA (560 mg, 771 microL, 5.58 mmol, 3.1 equiv), which was added dropwise over 15 minutes. After the addition the reaction mixture was thick with a white precipitate, the cooling bath was removed, and the mixture was stirred at room temperature for 1 hour. The reaction mixture was then diluted with ice water (50 mL) and allowed to stir for several hours. After this time, a white granular precipitate of the product had formed. The crude product was harvested by suction filtration on Fisherbrand® VR P5 medium filter paper and air-dried under suction for several hours. The crude solid was slurried with isopropanol to produce monomer 3 in pure form as a white crystalline powder (550 mg). The solid could be recrystallized from toluene and given microcrystalline needles. Single crystals were grown from acetone.

The following results were obtained: yield: 76%; melting point 140-142° C.; $^1H$ {$^{13}C$} NMR (CDCl$_3$, δ, ppm): 7.77-7.52 (m, 12H); $^{13}C$ {$^1H$} NMR (CDCl$_3$, δ, ppm): 153.26 (d, $J_{PC}$=16.4 Hz), 134.45 (d, $^1J_{PC}$=104.6 Hz), 131.85 (d, $J_{PC}$=13.6 Hz), 130.37 (d, $J_{PC}$=9.9 Hz), 120.03 (d, $J_{PC}$=2.8 Hz), 119.08 (d, $J_{PC}$=10.9 Hz), 107.91 (OCN); $^{31}P$ {$^1H$} NMR (CDCl$_3$, δ, ppm): 124.54 (m). The analytical calculated results for $C_{21}H_{12}N_3O_4P$: C, 62.85; H, 3.01; N, 10.47. The results found for the product: C, 63.08; H, 3.10; N, 10.40.

Example 3: X-Ray Structure Determination

Each example monomer described herein was grown, removed from their mother liquor solutions, coated with fluorinated oil, and examined under a conventional light microscope. Suitable crystals were mounted in the nitrogen cold stream provided by an Oxford Cryostream low-temperature apparatus on the goniometer head of a Bruker ApexII instrument equipped with a CCD detector and copper (k51.54178 Å) fine-focused sealed tube. Data were reduced using SAINT, and an empirical absorption correction was applied using SADABS.28 Structure solutions were determined using SHELXT-2015 and refined using SHELXL-2017.

Figure 7:
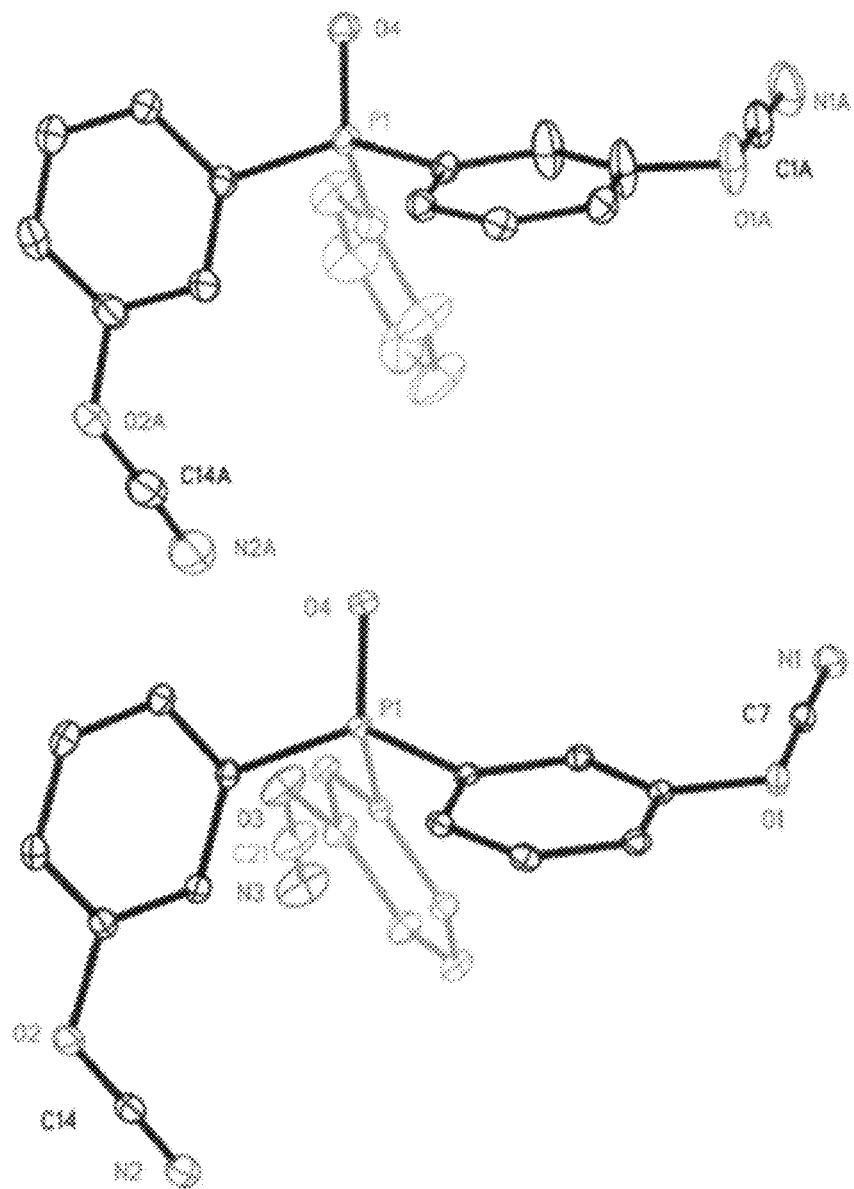
FIG. 7 is X-ray crystal structures of two examples of the cyanate ester resins described herein.

The results of the X-ray crystal structures are shown are shown in FIG. 7. Example 1 is shown in top portion, and Example 2 is shown in the lower portion, each at 50% thermal contours. Example 1 shows slight disorder in the cyanate groups. The hydrogen atoms and disorder were omitted for clarity.

Example 4: Thermal Analysis

Differential scanning calorimetry (DSC) was performed on about 10 mg of monomers reserved after de-gassing using a TA Instruments Q200 calorimeter under 50 mL min$^{-1}$ of flowing nitrogen. Samples were heated to 350° C. at 10° C. min$^{-1}$, then cooled at 5° C. min$^{-1}$ to 0° C. and re-heated to 350° C. at 10° C. min$^{-1}$. The results are shown below in Table 1.

TABLE 1

DSC analysis.

| Example | Melting Range (° C.) | Melting endotherm (Jg$^{-1}$) | Melting Max (° C.) | Cure Onset (° C.) | Exotherm Max (° C.) | ΔH$_{cure}$ (Jg$^{-1}$) | ΔH$_{cure}$ (kJ cyanate ester$^{-1}$) | T$_g$ (° C.) |
|---|---|---|---|---|---|---|---|---|
| 1 | 86-110 | 74.2 | 102.9 | 175 | 246.8 | 604 | 108.7 | 268 |
| 7 | 127-149 | 81.8 | 142.3 | 181 | 247.6 | 456 | 60.9 | Not detected |

The cyanate ester resins herein had a melting temperature ranging from about 84° C. to about 149° C. In addition, the glass transition temperature (T$_g$) of the cyanate ester resins herein were equal to or greater than 250° C. Example 2 had a high crosslink density, and therefore had no observable T$_g$ at or below 350° C.

Thermogravimetric analysis (TGA; under both nitrogen and air) was performed on about 10 mg to 20 mg samples of cured disks, using a TA Instruments Q5000 analyzer, at a gas flow rate of 20 mL min$^{-1}$ (balance) and 20 mL min$^{-1}$ (purge). The samples were equilibrated at 110° C. for 60 minutes and then heated at 10° C. min$^{-1}$ to 600° C. or 800° C. Table 2 below shows the results of the TGA.

TABLE 2

TGA analysis.

| Example | T at 5% weight loss (° C.) | | Char Yield 600° C. (%) | | Char Yield 800° C. (%) | | % Weight Loss at T (° C.) | | | | | |
|---|---|---|---|---|---|---|---|---|---|---|---|---|
| | N$_2$ | Air | N$_2$ | Air | N$_2$ | Air | N$_2$ | | | Air | | |
| | | | | | | | 450 | 550 | 600 | 450 | 550 | 600 |
| 1 | 409 | 408 | 64 | 65 | 58 | 27 | 12 | 16 | 8 | 12 | 16 | 7 |
| 2 | 412 | 408 | 70 | 70 | — | — | 11 | 14 | 5 | 11 | 13 | 4 |
| BADCy | 402 | 400 | 47 | 25 | — | — | 35 | 15 | 3 | 37 | 13 | 25 |

The results show the examples 1 and 2 were more stable than bisphenol A dicyanate ester in the TGA analysis. For example, examples 1 and 2 had much higher char yields at 600° C. than bisphenol A dicyanate in either air or nitrogen atmospheres, which demonstrates the resistance to heat by the cyanate ester resins herein.

Example 5: Flammability Testing

Cured sample disks of the monomers (Examples 1 and 2) and their LeCy and BADCy blends were made in cylindrical aluminum weigh dishes (20 mm×38 mm, wall thickness about 0.1 mm, volume about 2.5 mL; Wheaton). The cyanate ester blends (1 g total) were loaded into the microdishes and melted on a hotplate at 90° C. and mixed thoroughly with a glass spatula. Afterwards, the molten samples were heated and degassed in a Lab-Line Model 3608-5 vacuum oven (95° C., 60 torr, 1 hour). The samples were then transferred to a Barnstead/Thermolyne 48000 furnace and cured under flowing nitrogen by the following schedule: 1 hour at 150° C. then 3 hours at 200° C. and finally 1 hour at 250° C. The oven power was shut off and the samples were taken out the next day after cooling to ambient temperature for about 18 hours. The polycyanurate sample disks were demolded by cutting the exposed edge of the dishes with a razor blade in several places and then carefully peeling away the aluminum from the plastic with a pair of needle-nosed pliers. All of the polycyanurate specimens were tough enough that no cracking or chipping occurred during demolding. The curing process created void free polycyanurate disks by visual inspection. Note that no catalyst was added either to the newly synthesized monomers or to the commercial resins.

The cured sample disks (five/blend) were held in a blue Bunsen burner flame (natural gas) with a pair of long forceps. The disk was held in a vertical manner so that the flame reached halfway up the side of the disk. The disks were held in the flame for two 10 second periods, with a 10 second period in between to observe the sample, noting the after flame time ($t_1$ and $t_2$) with a stopwatch. The total after flame time ($t_1+t_2$) for each blend of five disks was added together to give the total after flame time in seconds. There was no dripping that occurred when any of the samples were placed in the flame. Table 3 below shows the results of flammability testing. Each component in Table 3 lists the wt % present in the cyanate ester blend.

TABLE 3

Flammability data from UL94 Analysis.

| PRIMASET ® LeCy | PRIMASET ® BADCy | Example 1 | Example 2 | $t_1 + t_2$ | UL94 Rating |
|---|---|---|---|---|---|
| 100 | 0 | 0 | 0 | 207 | F |
| 0 | 100 | 0 | 0 | 488 | F |
| 95 | 0 | 5 | 0 | 72 | V1 |
| 90 | 0 | 10 | 0 | 45 | V0 |
| 85 | 0 | 15 | 0 | 19 | V0 |
| 80 | 0 | 20 | 0 | 22 | V0 |
| 0 | 95 | 5 | 0 | 68 | V1 |
| 0 | 90 | 10 | 0 | 32 | V0 |
| 0 | 85 | 15 | 0 | 23 | V0 |
| 0 | 80 | 20 | 0 | 20 | V0 |
| 0 | 75 | 25 | 0 | 6 | V0 |
| 0 | 0 | 100 | 0 | 0 | V0 |
| 90 | 0 | 0 | 10 | 21 | V0 |
| 0 | 90 | 0 | 10 | 98 | V1 |

The bisphenol E dicyanate ester (LeCy) and the bisphenol A dicyanate ester (BADCy) failed the flammability testing, UL94 rating F, because of sustained combustion. Mixtures of 10 wt % example 1 with bisphenol E and bisphenol A dicyanate esters could achieve non-flammable V0 rating. Mixtures of 10 wt % example 2 with bisphenol E and bisphenol A dicyanate esters were either non-flammable V0 or nearly non-flammable V1, respectively. In addition, example 1 without mixing with any other resin also achieved a flammability rating of V0.

Figure 8:
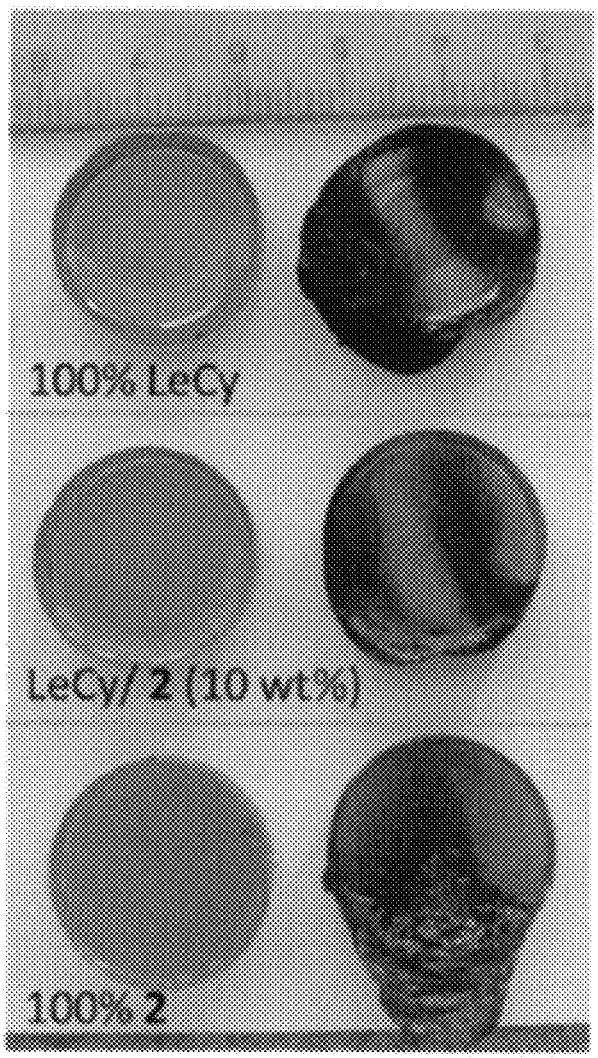
FIG. 8 is a photo of example cyanate ester resin disks before (on the left) and after (on the right) flammability testing.

FIG. 8 shows results of three samples of cured disks. One sample was made entirely from bisphenol A dicyanate (LeCy). The other two samples were made from various portions of bisphenol A dicyanate (LeCy) and Example 1. FIG. 8 shows the cured disks before flame testing on the left and after flame testing on the right. Each of the three samples include the composition written below each of the cured disks before flame testing. The middle and bottom samples achieved a non-flammable rating of V0, while the top sample (100% LeCy) achieved a rating of F for sustained combustion.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Unless otherwise stated, any feature described herein can be combined with any aspect or any other feature described herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5 wt % to about 75 wt % should be interpreted to include not only the explicitly recited limits of from about 5 wt % to about 75 wt %, but also to include individual values, such as 15 wt %, 35 wt %, 55 wt %, etc., and sub-ranges, such as from about 25 wt % to about 45 wt %, etc.

In describing and claiming the examples disclosed herein, the singular forms "a", "an", and "the" include plural referents unless the context clearly dictates otherwise.

What is claimed is:

1. A method for making a cyanate ester resin, comprising:
   reacting an arylorganometallic agent with a phosphorous halide in a solvent,
   wherein the arylorganometallic agent comprises at least one methoxyarylorganometallic agent,
   thereby forming methoxy functionalized triphenylphosphines with one to six meta-methoxy groups;

reacting the methoxy functionalized triphenylphosphines including one to six meta-methoxy groups with an oxidizing agent, thereby forming a methoxy functionalized triphenylphosphine oxide including one to six meta-methoxy groups;

reacting the methoxy functionalized triphenylphosphine oxide including one to six meta-methoxy groups with a dealkylating agent, thereby forming a hydroxy substituted triphenylphosphine oxide including one to six meta-hydroxyl groups;

reacting the hydroxy substituted triphenylphosphine oxide including one to six meta-hydroxyl groups with a cyanating reagent and a base, thereby forming a cyanato substituted triphenylphosphine oxide including one to six meta-cyanato groups; and polymerizing the substituted triphenylphosphine oxide including one to six meta-cyanato groups, thereby forming the cyanate ester resin.

2. The method of claim 1, wherein the at least one methoxyarylorganometallic agent is selected from the group consisting of, 3-methoxyphenyllithium, 3,5-dimethoxyphenyllithium, 3-methoxyphenylmagnesium, 3,5-dimethoxyphenylmagnesium, and combinations thereof.

3. The method of claim 1, wherein the phosphorous halide is selected from the group consisting of phosphorus tribromide, phosphorus trichloride, and combinations thereof.

4. The method of claim 1, wherein the methoxy functionalized triphenylphosphines with one to six methoxy groups is selected from the group consisting of 3-methoxyphenyldiphenylphosphine, bis(3-methoxyphenyl)phenylphosphine, tris(3-methoxyphenyl)phosphine, 3,5-dimethoxyphenyldiphenylphosphine, bis(3,5-dimethoxyphenyl)phenylphosphine, tris(3,5-dimethoxyphenyl)phosphine, bis(3-methoxyphenyl)3,5-dimethoxyphenylphosphine, bis(3,5-dimethoxyphenyl)3-methoxyphenylphosphine, 3,5-dimethoxyphenyl-3-methoxyphenyl-phenylphosphine, and combinations thereof.

5. The method of claim 1 wherein the oxidizing agent is selected from the group consisting of aqueous hydrogen peroxide, a mixture of oxygen and nitrogen, iodosobenzene, iodoxybenzene, metachloroperoxybenzoic acid (MCPBA), tert-butylhydroperoxide manganese diiodide, dimethyldioxirane, potassium peroxymonosulfate, sodium perbromate, sodium perborate and combinations thereof.

6. The method of claim 1, wherein the methoxy functionalized triphenylphosphine oxide including one to six methoxy groups is selected from the group consisting of 3-methoxyphenyldiphenylphosphineoxide, bis(3-methoxyphenyl) phenylphosphineoxide, tris(3-methoxyphenyl)phosphineoxide, 3,5-dimethoxyphenyldiphenylphosphineoxide, bis(3,5-dimethoxyphenyl)phenylphosphineoxide, tris(3,5-dimethoxyphenyl)phosphineoxide, bis(3-methoxyphenyl)3,5-dimethoxyphenylphosphineoxide, bis(3,5-dimethoxyphenyl)3-methoxyphenylphosphineoxide, 3,5-dimethoxyphenyl-3-methoxyphenyl-phenylphosphineoxide, and combinations thereof.

7. The method of claim 1, wherein the dealkylating agent is selected from the group consisting of pyridinium hydrochloride, hydroiodic acid, hydrobromic acid, potassium hydroxide, boron tribromide, sodium ethanethiolate, lithium chloride; trimethylsilyl iodide; and combinations thereof.

8. The method of claim 1, wherein the hydroxy substituted triphenylphosphineoxide including one to six hydroxyl groups is selected from the group consisting of 3-hydroxyphenyldiphenylphosphineoxide, bis(3-hydroxyphenyl) phenylphosphineoxide, tris(3-hydroxyphenyl)phosphineoxide, 3,5-dihydroxyphenyldiphenylphosphineoxide, bis(3,5-dihydroxyphenyl)phenylphosphineoxide, tris(3,5-dihydroxyphenyl)phosphineoxide, bis(3-hydroxyphenyl)3,5-dihydroxyphenylphosphineoxide, bis(3,5-dihydroxyphenyl)3-hydroxyphenylphosphineoxide, 3,5-dihydroxyphenyl-3-hydroxyphenyl-phenylphosphineoxide, and combinations thereof.

9. The method of claim 1, wherein the cyanating reagent are selected from the group consisting of cyanogen bromide, cyanogen chloride, para-toluenesulfonyl cyanaide, benzenesulfonyl cyanide and combinations thereof.

10. The method of claim 1, wherein the cyanato substituted triphenylphosphineoxide are selected from the group consisting of 3-cyanatophenyldiphenylphosphineoxide, bis(3-cyanatophenyl)phenylphosphineoxide, tris(3-cyanatophenyl)phosphineoxide; 3,5-dicyanatophenyldiphenylphosphineoxide, bis(3,5-dicyanatophenyl)phenylphosphineoxide, tris(3,5-dicyanatophenyl)phosphineoxide, bis(3-cyanatophenyl)3,5-dicyanatophenylphosphineoxide, bis(3,5-dicyanatophenyl)3-cyanatophenylphosphineoxide, 3,5-dicyanatophenyl-3-cyanatophenyl-phenylphosphineoxide, and combinations thereof.

11. The method of claim 1, wherein the cyanato substituted triphenylphosphineoxide are polymerized by heating the cyanato substituted triphenylphosphineoxide to a temperature ranging; from about 170° C. to about 225° C.

12. The method of claim 1, further including blending the cyanato substituted triphenylphosphineoxide with a second cyanate ester resin in an amount ranging from about 5 wt % to about 75 wt % based on the total wt % of the cyanate ester resin.

13. The method of claim 12, wherein the second cyanate ester resin is selected from the group consisting of 2,2-bis(4-cyanatophenyl)propane, 1,1-bis(4-cyanatophenyl)ethane, bis(3,5-dimethyl-4-cyanatophenyl)methane, 3,5-bis(2-(4-cyanatophenyl)-propanyl)benzene, and combinations thereof.

14. A cyanate ester resin, comprising:
a repeating unit polymerized from a chemical structure including:

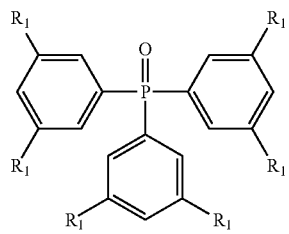

wherein $R_1$ is OCN.

15. The cyanate ester resin of claim 14, wherein the glass transition temperature is equal to or greater than 250° C.

16. The cyanate ester resin of claim 14, wherein the cyanate ester resin has a UL 94 classification of V-0.

17. The cyanate ester resin of claim 14, wherein the cyanate ester resin further includes a repeating unit polymerized from a cyanate ester resin selected from the group consisting of 2,2-bis(4-cyanatophenyl)propane, 1,1-bis(4-cyanatophenyl)ethane, bis(3,5-dimethyl-4-cyanatophenyl)methane, 3,5-bis(2-(4-cyanatophenyl)-propanyl)benzene, and combinations thereof.

18. The method of claim 1, wherein the arylorganometallic agent further comprises phenyllithium.

* * * * *